United States Patent
Shreve et al.

(10) Patent No.: US 11,431,894 B2
(45) Date of Patent: Aug. 30, 2022

(54) SYSTEM AND METHOD FOR SMART-IMAGE CAPTURING

(71) Applicant: Palo Alto Research Center Incorporated, Palo Alto, CA (US)

(72) Inventors: Matthew A. Shreve, Mountain View, CA (US); Raja Bala, Pittford, NY (US); Jeyasri Subramanian, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 211 days.

(21) Appl. No.: 16/783,950

(22) Filed: Feb. 6, 2020

(65) Prior Publication Data
US 2021/0250492 A1    Aug. 12, 2021

(51) Int. Cl.
*H04N 5/232* (2006.01)
*G06T 7/44* (2017.01)
*G06T 7/00* (2017.01)
*H04N 5/247* (2006.01)

(52) U.S. Cl.
CPC ....... *H04N 5/23222* (2013.01); *G06T 7/0002* (2013.01); *G06T 7/44* (2017.01); *G06T 7/97* (2017.01); *H04N 5/247* (2013.01)

(58) Field of Classification Search
CPC .............. H04N 5/23222; H04N 5/247; H04N 5/23218; H04N 5/2351; G06T 7/0002; G06T 7/44; G06T 7/97
See application file for complete search history.

(56) References Cited

U.S. PATENT DOCUMENTS

| | | | |
|---|---|---|---|
| 2015/0264267 A1* | 9/2015 | Park | H04N 5/23222 348/333.02 |
| 2016/0286114 A1* | 9/2016 | Fan | H04N 5/23212 |
| 2019/0147620 A1* | 5/2019 | Pinel | H04N 5/23206 382/159 |

* cited by examiner

*Primary Examiner* — Gevell V Selby
(74) *Attorney, Agent, or Firm* — Shun Yao; Yao Legal Services, Inc.

(57) ABSTRACT

One embodiment can include a system for providing an image-capturing recommendation. During operation the system receives, from a mobile computing device, one or more images. The one or more images are captured by one or more cameras associated with the mobile computing device. The system analyzes the received images to obtain image-capturing conditions for capturing images of a target within a physical space; determines, based on the obtained image-capturing conditions and a predetermined image-quality requirement, one or more image-capturing settings; and recommends the determined one or more image-capturing settings to a user.

20 Claims, 9 Drawing Sheets
(3 of 9 Drawing Sheet(s) Filed in Color)

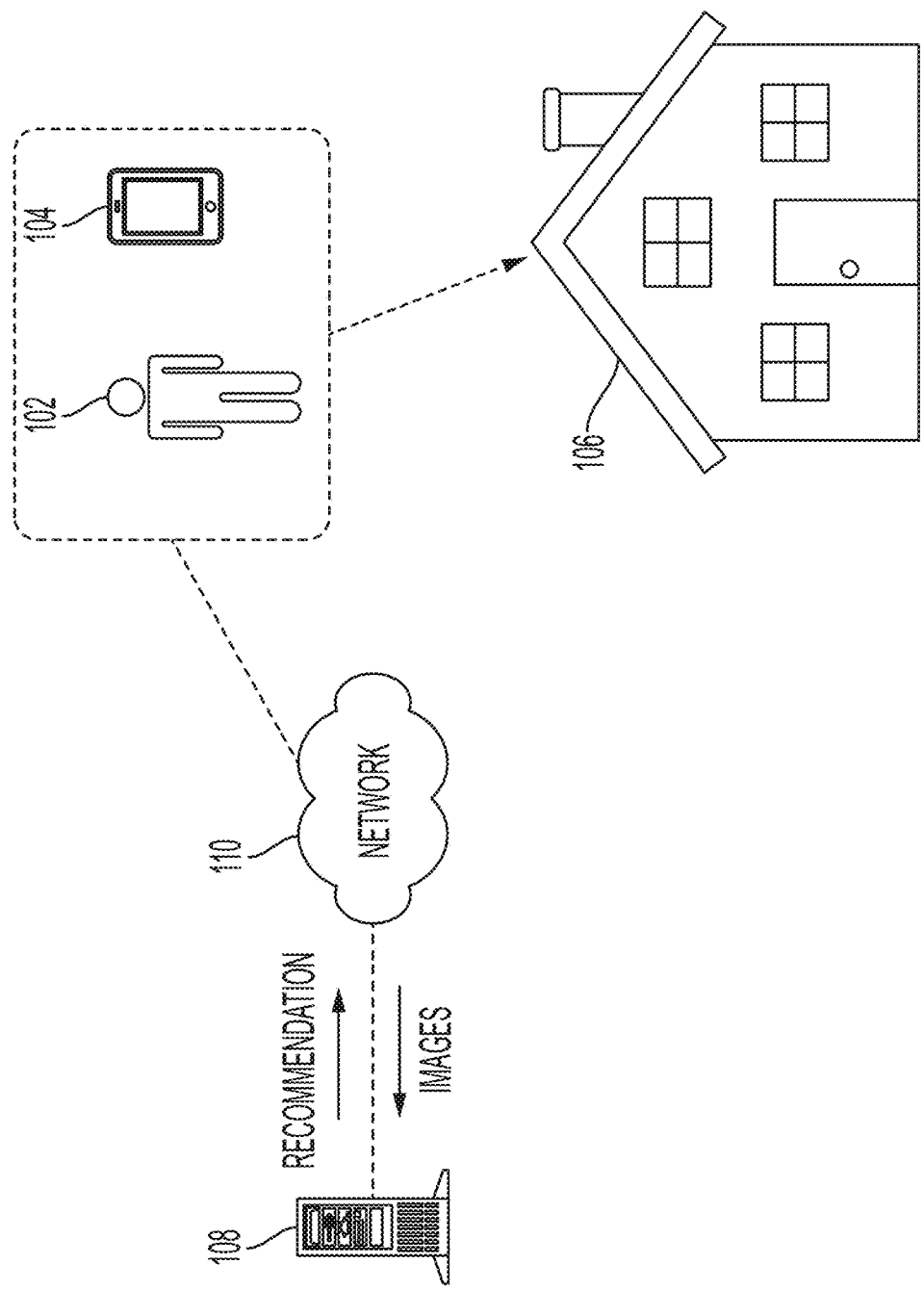

SYSTEM AND METHOD FOR SMART-IMAGE CAPTURING

BACKGROUND

Field

This disclosure is generally related to image-capturing. More specifically, this disclosure is related to a system and method that facilitating smart image-capturing.

Related Art

The proliferation of camera-enabled mobile devices has enabled many regular users or consumers to participate in many activities remotely. For example, a patient with a skin condition used to walk into an office of a dermatologist to receive a diagnosis. With the help of a camera-equipped mobile device and certain applications running on the mobile device, a patient can now interact with a dermatologist remotely by transferring images of areas of concern on their skin. Moreover, the taking and sharing of self portraits or "selfies" has become a popular social activity.

However, ordinary users of mobile devices often lack the knowledge and/or technique to take high-quality images. Many self-taken images or selfies are taken in an environment with poor lighting conditions. Such poor quality images may not be suitable for certain special applications, such as for diagnosis of skin conditions. Moreover, certain scientific research relies or crowd-sourcing to gather data. For example, developers of skin care products collect and analyze facial images from a large crowd to obtain data about skin age, health, appearance of wrinkles, etc. Similarly, age-prediction applications often rely on facial images to predict users' age, and poor quality face images (e.g., images having strong shadows, low and high contrast, low and bright light) can skew the age-prediction result. Obtaining images of consistent quality is also important for applications requiring longitudinal data (e.g., study of long-term effects of a skin care product).

SUMMARY

One embodiment can include a system for providing an image-capturing recommendation. During operation the system receives, from a mobile computing device, one or more images. The one or more images are captured by one or more cameras associated with the mobile computing device. The system analyzes the received images to obtain image-capturing conditions for capturing images of a target within a physical space; determines, based on the obtained image-capturing conditions and a predetermined image-quality requirement, one or more image-capturing settings; and recommends the determined one or more image-capturing settings to a user.

In a variation on this embodiment, the one or more images include images of the physical space, images of the target, or both.

In a further variation, the mobile computing device can include at least two cameras configured to capture, simultaneously, an image of the physical space and an image of the target.

In a variation on this embodiment, the system receives metadata associated with a respective image, and obtaining the image-capturing conditions can include analyzing the metadata.

In a variation on this embodiment, a respective image-capturing setting can include at least one of: a location, a time, and camera geometry.

In a variation on this embodiment, the system generates a map associated with the physical space and displays a location indicator on the map, indicating a recommended location within the physical space for capturing an image of the target.

In a variation on this embodiment, analyzing a respective image can include identifying one or more objects within a respective image and computing lighting statistics associated with an identified object within the respective image.

In a further variation, the lighting statistics can include an image histogram associated with the identified object within the respective image.

In a variation on this embodiment, the system collects contextual data associated with daily activities of the user and determines, based on the collected contextual data, an image-capturing setting.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1 presents an exemplary use scenario of the novel smart image-capturing system, according to one embodiment.

In the figures, like reference numerals refer to the same figure elements.

DETAILED DESCRIPTION

Figure 2C:
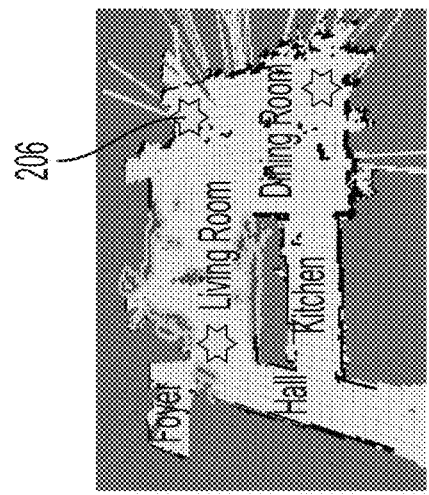
FIGS. 2A-2C illustrate exemplary maps generated by the mapping module, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of providing a smart image-capturing system that can guide an ordinary user of a camera-equipped mobile computing device in capturing images for scientific or medical analysis (e.g., selfies, images of other body parts, images of other types of object) such that the images can be captured at substantially optimum conditions, thus ensuring the quality of the captured images. More specifically, the smart image-capturing system collects various information associated with the environment in which the user would nominally capture images for scientific or medical analysis (e.g., the user's residence) and analyzes such an environment to determine one or more locations that can provide optimum conditions for capturing images (e.g., a location with a more uniform lighting condition than another). In some embodiments, the smart image-capturing system can use both the front-facing and rear-facing cameras of a mobile device to concurrently capture images of the environment and the area of interest (e.g., the user's face or body part). By analyzing these images (e.g., color histograms), the smart image-capturing system can identify and recommend to the user one or more image-capturing locations best suited for subsequent image analysis. In one embodiment, the smart image-capturing system can "sense" and "understand" the environment, and can make a recommendation to the user to actively adjust the environment (e.g., turning on a light or opening a window) to obtain better image-capturing conditions. Additionally, the smart image-capturing system may also collect other contextual information associated with the user, and can recommend to the user, based on the collected contextual information, both a location and a time instant for capturing the image.

Smart Image-Capturing System

Many modern applications rely on images submitted by ordinary users of mobile computing devices to extract importation information. For example, a dermatologist remotely diagnosing a patent's skin condition may want to see high-quality images of the affected area. Similarly, researchers studying the long-term effect of a skin care product may wish to view a series of high-quality facial images of a sample population over an extended time period. However, ordinary users of mobile computing devices often lack the skill or knowledge to take high-quality images (e.g., selfies) required for such analysis.

As discussed previously, images taken by ordinary users of mobile computing devices often cannot meet the quality standards of certain applications that rely on information extracted from the images. It is desirable to have an image-capturing system that can provide guidance to ordinary users when they capture images in order to control the quality of the captured images. However, current image-capturing applications often merely provide simple user prompts, such as a bounding box around a detected face. Such limited guidance cannot ensure a good image quality. On the other hand, although the auto-focusing capability provided by cameras on mobile devices has made focusing an easy task, even for amateurs, these mobile devices often have limited control of illumination and mostly rely on lighting in the environment. To provide better guidance to users, in some embodiments, a smart image-capturing system can be configured to monitor the environment or physical space the user is in and to guide the user in navigating the physical space to find a location that has optimum lighting for the user to capture images (e.g., selfies).

FIG. 1 presents an exemplary use scenario of the novel smart image-capturing system, according to one embodiment. In the example shown in FIG. 1, a user 102 is equipped with a mobile computing device 104, which can be used to capture images. User 102 can be situated in a physical space 106. In the example shown in FIG. 1, mobile computing device 104 can include a handheld computer (e.g., a tablet computer or a smartphone) or a wearable device (e.g., a pair of smart glasses). Mobile computing device 104 can communicate with a server 108 via a network 110.

During operation, user 102 can walk around physical space (e.g., a house) 106 while carrying mobile computing device 104. User 102 can also capture images or video of his surroundings using a camera on mobile computing device 104. For example, user 102 can capture images of different rooms in house 106; or user 102 can capture images at different locations within a single room (e.g., the living room) in house 106. Each image can be matched with a set of metadata that includes, but is not limited to: date, time of the day, weather, location, etc. Moreover, user 102 can capture images of an intended target (e.g., the user's face or body part, or a calibration target), images of the environment surrounding the user, or both.

In some embodiments, computing device 104 can send, over network 110, such images and metadata to a server 108 for analysis. Alternatively, computing device 104 can analyze images locally. Based on captured images of the environment, a scene-understanding module (which can reside on mobile computing device 104 or server 108) can identify objects (e.g., windows, window blinds, furniture, sinks, mirrors, etc.), semantics (rooms, floors, entryways, stairs, hallways, etc.), and light sources (e.g., lamps, ceiling lighting, natural lighting, outdoor lighting, etc.). Moreover, the scene-understanding module can also calculate and record statistics that measure lighting quality (e.g., intensity, contrast, uniformity, etc.). Such lighting-quality statistics can be computed over an entire image, over a portion of the image, or over an object of interest within the image. Similarly, based on captured images of the target, a target-understanding module (which can reside on mobile computing device 104 or server 108) can also calculate and record lighting-quality statistics associated with the target.

As user 102 walks around physical space 106, additional sensors (e.g., an accelerometer, a compass, etc.) on mobile computing device 104 can collect additional data, which can be combined with the captured images to facilitate the creation of one or more maps of the environment. For example, using the Simultaneous Localization and Mapping (SLAM) technique, a mapping module can generate a full 3D reconstruction of the environment. Alternatively, the mapping module can generate a 2D floor plan mapping the rooms and objects found in each room, a 2D user movement trajectory, or a series of images that are sequentially sorted to show the various paths that can be taken in the environment.

Figure 2B:
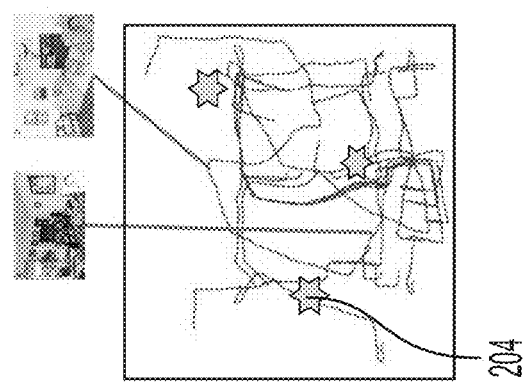
Figure 2A:
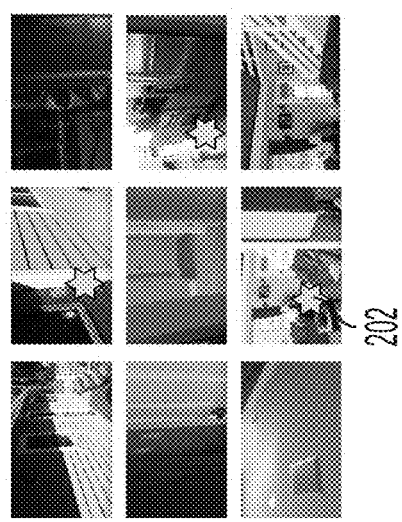

FIGS. 2A-2C illustrate exemplary maps generated by the mapping module, according to one embodiment. More specifically, FIG. 2A illustrates a series of images in the environment; FIG. 2B illustrates a 2D user movement trajectory; and FIG. 2C illustrates a 2D floor plan reconstructed using collected images of the environment.

Based on the lighting-quality statistics collected from images of the environment and/or the target, a recommendation engine, which can either reside on server 108 or mobile device 104, can determine one or more desirable locations within physical space 106 and recommend such locations to user 102 such that user 102 can take a high-quality image at a recommended location. The recommended locations can be communicated to the user using various communication mechanisms, including a visual mechanism, an audio mechanism, and a combination thereof. In some embodiments, a recommended image-capturing location can be communicated to the user by displaying a visual indicator on a map of the physical space. In the examples shown in FIGS. 2A-2C, each recommended location is indicated on a map using a star (e.g., stars 202, 204, and 206).

Figure 3:
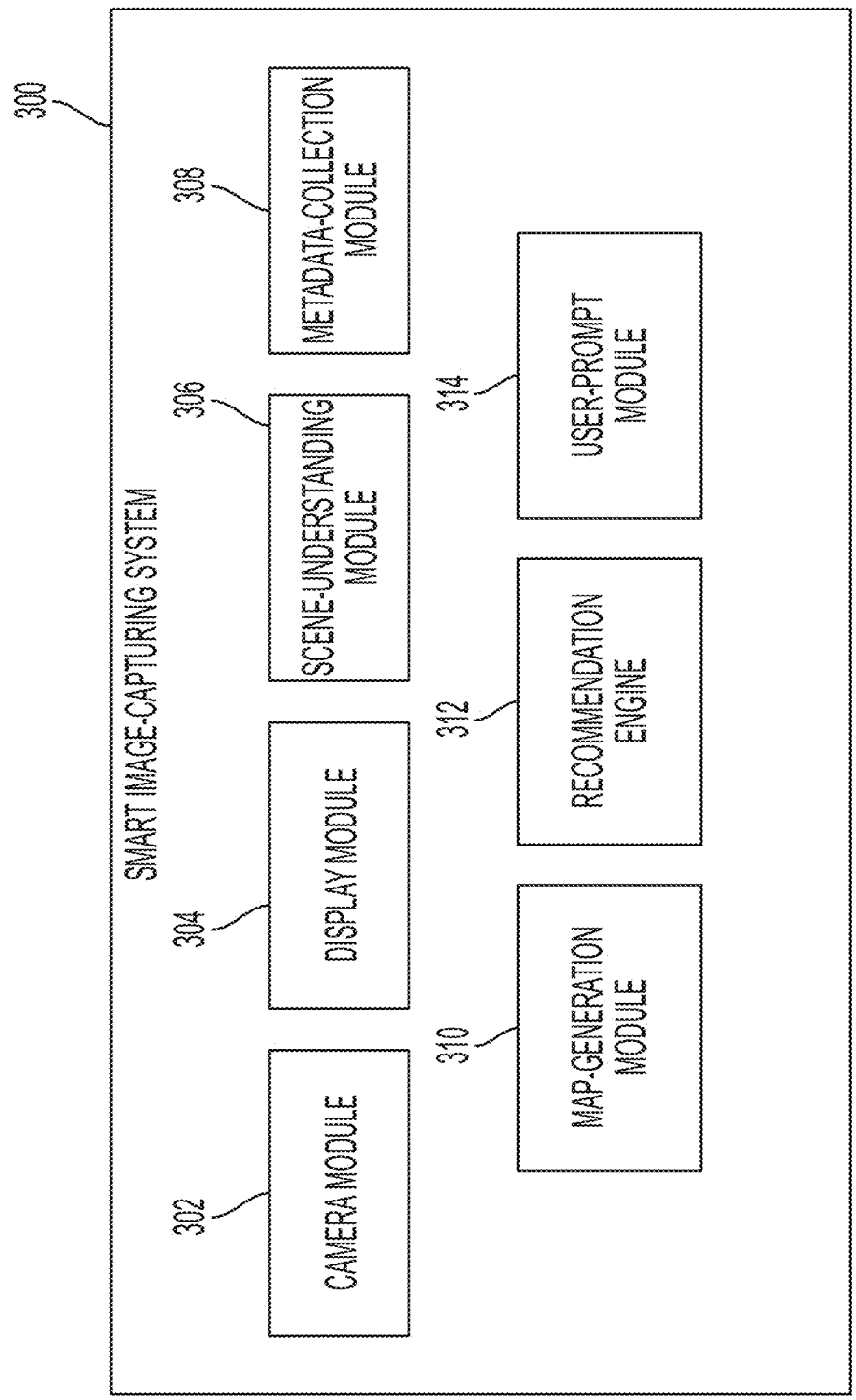
FIG. 3 illustrates an exemplary smart image-capturing system, according to one embodiment.

FIG. 3 illustrates an exemplary smart image-capturing system, according to one embodiment. Smart image-capturing system 300 can include a camera module 302, a display module 304, a scene-understanding module 306, a metadata-collection module 308, a map-generation module 310, a recommendation engine 312, and a user-prompt module 314.

Camera module 302 can be used to capture images (e.g., still images or video) of the physical environment a user is in. The physical environment can include an indoor space (e.g., a room, a house, an office building, etc.), an outdoor space, or other types of enclosed space (e.g., inside a vehicle or a garage). In some embodiments, camera module 302 can capture images of the environment at a first resolution, which can be relatively low. Once a recommendation is made to the user regarding an ideal location for capturing the image of a particular target, camera module 302 can also be used to capture a high-resolution image of the target (or an image of a second resolution), which can be the face or a body part of the user, or other types of object, depending on the specific application. The second resolution is much higher than the first resolution.

Display module 304 can display the captured images. Moreover, display module 304 can display a user interface that can guide the user through the process of taking a high-quality image of the target. For example, display module 304 can display visual instructions, instructing the user regarding various image-capturing conditions, e.g., the location, the timing, the placement of the target, the camera orientation, etc. In some embodiments, display module 304 can display a map of the physical environment, and add visual indicators or markings on the map to communicate to the user one or more optimum or ideal locations for capturing images that meet the standard of a specific application (e.g., an application analyzing facial skin conditions or a telemedicine application).

Figure 4A:
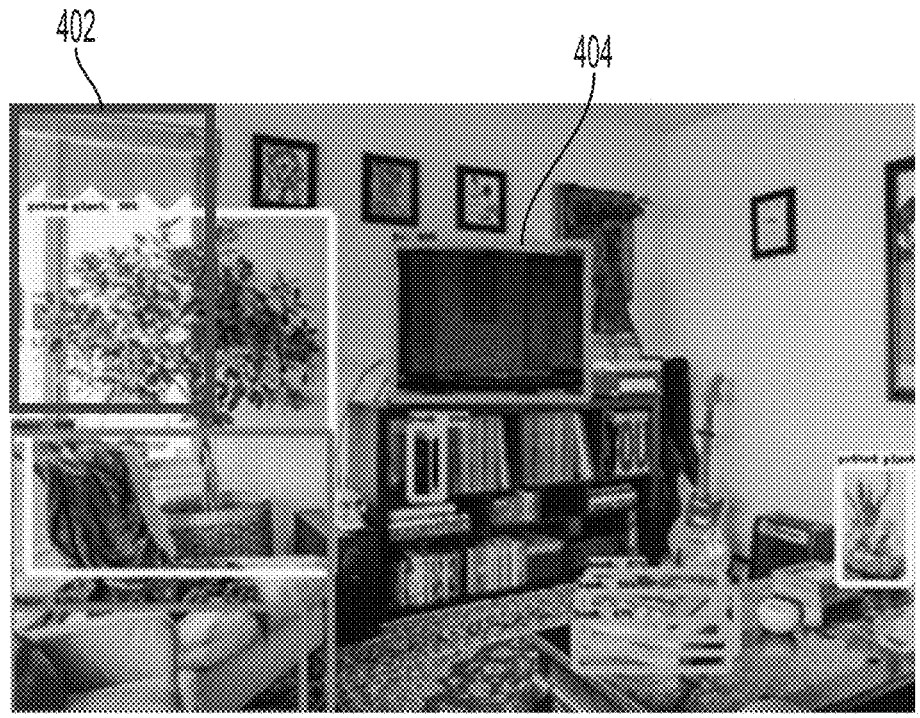
FIG. 4A illustrates an exemplary image of a physical environment, according to one embodiment.

Scene-understanding module 306 can perform two functions using various image-analysis techniques. The first function involves recognizing individual objects as well as semantics in the physical environment. Examples of indoor objects can include windows, window blinds, doors, various types of furniture (e.g., desks, chairs, beds, etc.), sinks, mirrors, etc. Examples of outdoor objects can include trees, roads, buildings, vehicles, etc. Examples of the semantics can include rooms, floors, entryways, stairs, hallways, etc. Moreover, scene-understanding module 306 can also identify one or more light sources, including indoor (e.g., lamps, ceiling lights) and outdoor (e.g., natural light, street lights, etc.) light sources. FIG. 4A illustrates an exemplary image of a physical environment, according to one embodiment. In FIG. 4A, the physical environment is a room, and a number of objects in the room are identified by scene-understanding module 306, as indicated by a number of bounding boxes (e.g., boxes 402 and 404).

Figure 4B:
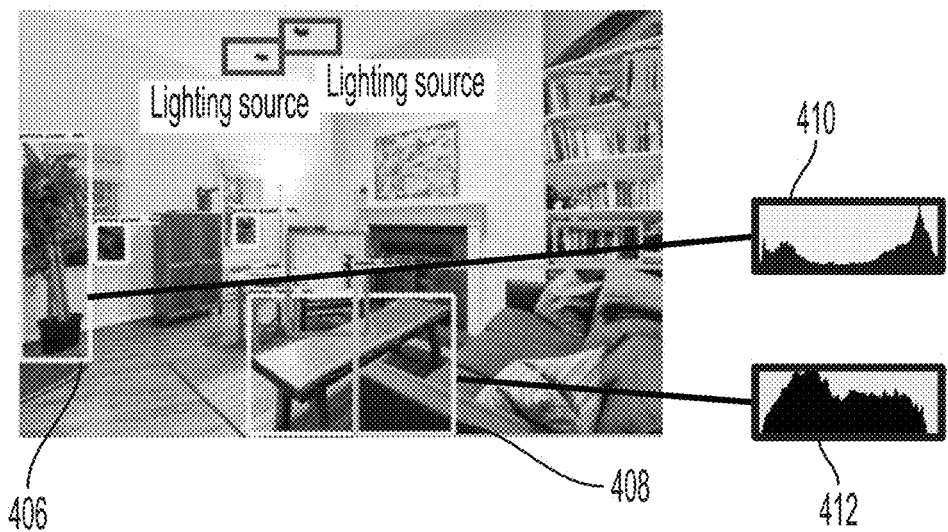
FIG. 4B illustrates an exemplary image of a physical environment, according to one embodiment.

Returning to FIG. 3, the second function performed by scene-understanding module 306 can involve collecting lighting statistics of the environment based on the captured images of the environment. Examples of the lighting statistics can include light intensity, contrast, uniformity, etc. FIG. 4B illustrates an exemplary image of a physical environment, according to one embodiment. In FIG. 4B, the physical environment is a room. In addition to identifying a number of objects in the room, as indicated by the bounding boxes (e.g., boxes 406 and 408), scene-understanding module 306 can also analyze the image to obtain lighting statistics at different portions of the image. More specifically, the lighting statistics (e.g., dynamic ranges) of each identified object in the image can be computed and presented to user. In the example shown in FIG. 4B, image histograms 410 and 412 corresponding to bounding boxes 406 and 408, respectively, also are presented to the user.

Returning to FIG. 3, metadata-collection module 308 can collect metadata from a number of sensors (which can include, but are not limited to: a clock, a compass, an accelerometer, a gyroscope, etc.) and a number of applications (a weather application, a calendar application, etc.). The metadata collected at a particular time instant can be associated with image(s) captured at that particular time instant. In some embodiments, metadata-collection module 308 may collect metadata when the camera is off. More specifically, when the user is required to capture images over a long time period, metadata-collection module 308 can collect metadata over that long time period. The collected metadata can be used to infer contextual information associated with the user, such as the user's movement pattern and locations frequented by the user. Based on such contextual information, the system can identify time and location where the user can capture images. Map-generation module 310 can generate various types of map (similar to the ones shown in FIGS. 2A-2C) of the physical space based on the collected metadata.

Recommendation engine 312 can be responsible for generating an image-capturing recommendation, which can specify a setting for the user to capture an image for a particular application. The setting can include various factors that can affect the quality of the captured image, including but not limited to: physical location, lighting characteristics, camera geometry, time of day, etc. In some embodiments, recommendation engine 312 takes as input the lighting statistics collected from the captured images and metadata collected while the images are taken, and outputs a recommendation or prediction accordingly. For example, based on the lighting statistics (e.g., light intensity, contrast, existence of shadow) for various objects within the physical space, recommendation engine 312 can predict that at a particular time of day, the user can take a high-quality image while standing next to a window, because an object in the image next to the window demonstrates a good lighting quality at that particular time of day. Other features extracted from the images can also be used by recommendation engine 312 to predict the quality of a to-be-captured image. Such features can include but are not limited to: positions and/or orientations of artificial light sources, the diffusive quality of the lights, the position and intensity of the shadows, color temperatures, availability of outdoor light sources, etc. For example, recommendation engine 312 can predict that at a particular time of day, the user can take a high-quality image while standing next to a window, because at that particular time, a natural light source (e.g., sunlight) can provide ideal lighting through the window. To make such a recommendation, recommendation engine 312 can apply a number of predetermined rules, e.g., rules regarding the lighting statistics in the captured images or rules regarding available light sources. Alternatively, recommendation engine 312 can implement a machine-learning method to make recommendations. More specifically, recommendation engine 312 can be trained, ahead of time, to associate features of images of the environment with quality of captured images of the target. Note that recommendations are tailored to a specific user and/or target.

In the event that the user is taking images over an extended time period (e.g., a few months or longer), recommendation engine 312 makes a recommendation regarding the location and/or time for the user to capture an image of a target based on contextual information of user activities. Such contextual information can be inferred from metadata collected prior to and during that extended time period. For example, based on metadata collected over an extended time period, recommendation engine 312 can determine that every weekday at 5 pm, the user is in an office with a west-facing window. Accordingly, recommendation engine 312 may recommend that the user take a selfie while standing next to the west-facing on a weekday at 5 pm.

User-prompt module 314 can communicate the recommendation(s) generated by recommendation engine 312 to the user. In some embodiments, such recommendations are presented to the user in the form of user prompts, including both visual prompts and audio prompts. Some user prompts can include a text message displayed on display module 304 or an audio message played by a speaker associated with smart image-capturing system 300. In one embodiment, smart image-capturing system 300 can implement an augmented-reality (AR) application. As the user moves around a physical space (e.g., a residence or an office building) and captures images of the environment, user-prompt module 314 can generate and display annotations, in real time, on the captured images of the environment, indicating to the user an optimum location or locations for capturing images of the target. The annotations can be in various formats, including but not limited to: written text, arrows, stars, smiley faces, circles, etc., as long as an annotation can bring the user's attention to a particular location in the physical space. In the example shown in FIGS. 2A-2C, a number of stars are added onto the displayed maps, indicating to the user recommended locations for the user to capture an image of the target (e.g., for taking a selfie).

Figure 5:
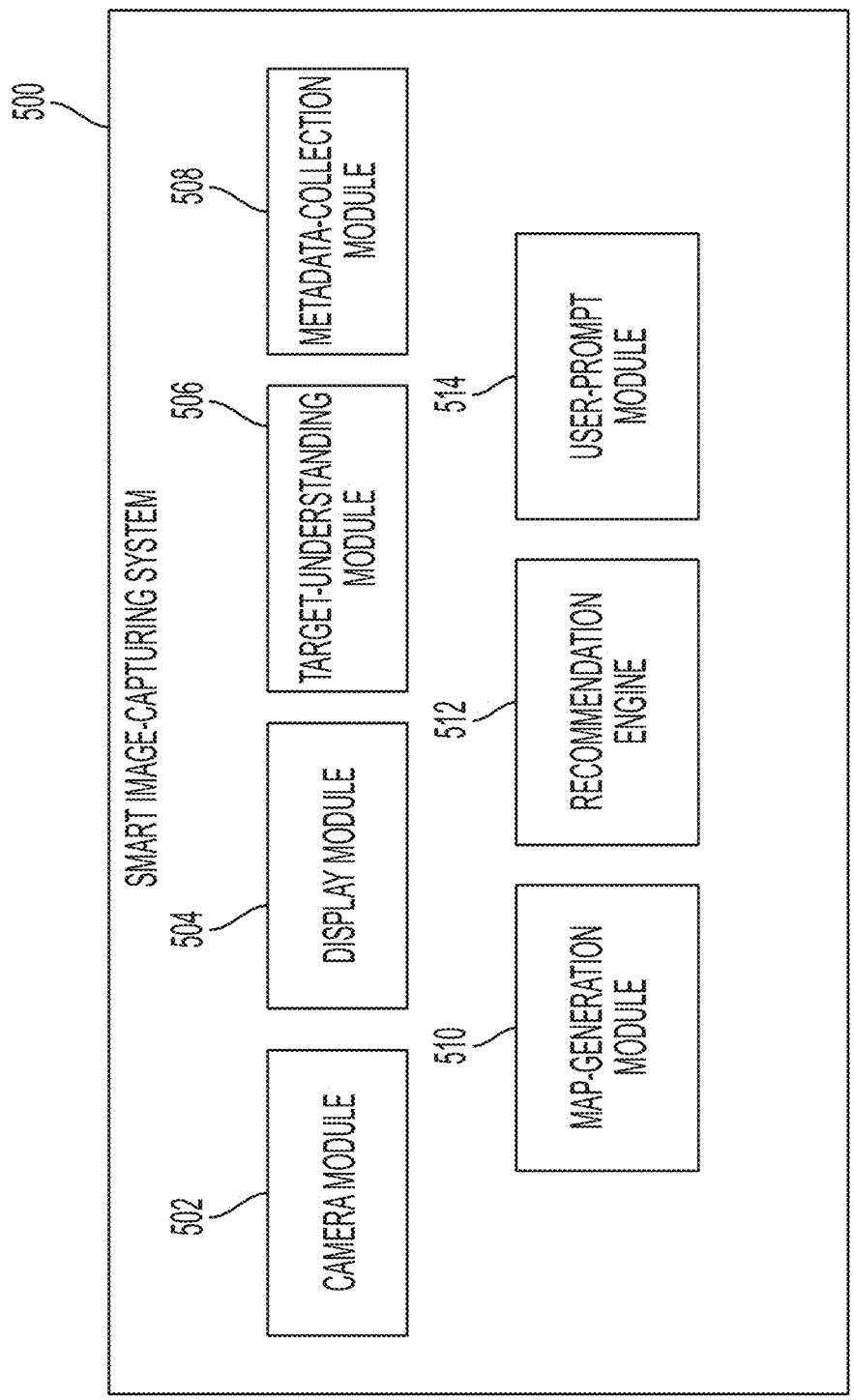
FIG. 5 illustrates an exemplary smart image-capturing system, according to one embodiment.

FIG. 5 illustrates an exemplary smart image-capturing system, according to one embodiment. Smart image-capturing system 500 can include a camera module 502, a display module 504, a target-understanding module 506, a metadata-collection module 508, a map-generation module 510, a recommendation engine 512, and a user-prompt module 514.

Unlike camera 302 shown in FIG. 3, camera 502 is configured to capture images of the target (e.g., the user's face or other body part, an object, a color-calibration target, etc.). In some embodiments, camera 502 can be configured to capture low-resolution images of the target. Display module 504 can be similar to display module 304. Display module 504 can display a smart image-capturing user interface. Moreover, display module 504 can display images of the target captured by camera module 502.

Target-understanding module 506 can be responsible for analyzing the images that include the target. More specifically, target-understanding module 506 can collect and record lighting statistics associated with the target in each image. For example, if the image is the user's selfie with the target being the user's face, target-understanding module 506 can collect lighting statistics (e.g., intensity, contrast, shadowing, etc.) of the user's face in each image.

Metadata-collection module 508 can be similar to metadata-collection module 308 shown in FIG. 3. Map-generation module 510 can be similar to map-generation module 310. More specifically, because camera module 502 does not capture images of the environment, map-generation module 510 generates the map of the physical space using metadata collected by metadata-collection module 508.

Recommendation engine 512 can generate recommendations based on the lighting statistics of the target in the image as well as the metadata. For example, if the target demonstrates good lighting characteristics (e.g., having desired brightness and contrast level, little or no shadow, etc.) in one image, and metadata associated with the image indicates that the image of the target is taken at a particular location, recommendation engine 512 can then recommend that the user go to this location to take a high-resolution image of the target. It is most likely that this high-resolution image is of good quality and can meet the requirements of the specific application requiring the image. User-prompt module 514 can be similar to user-prompt module 314.

Figure 6:
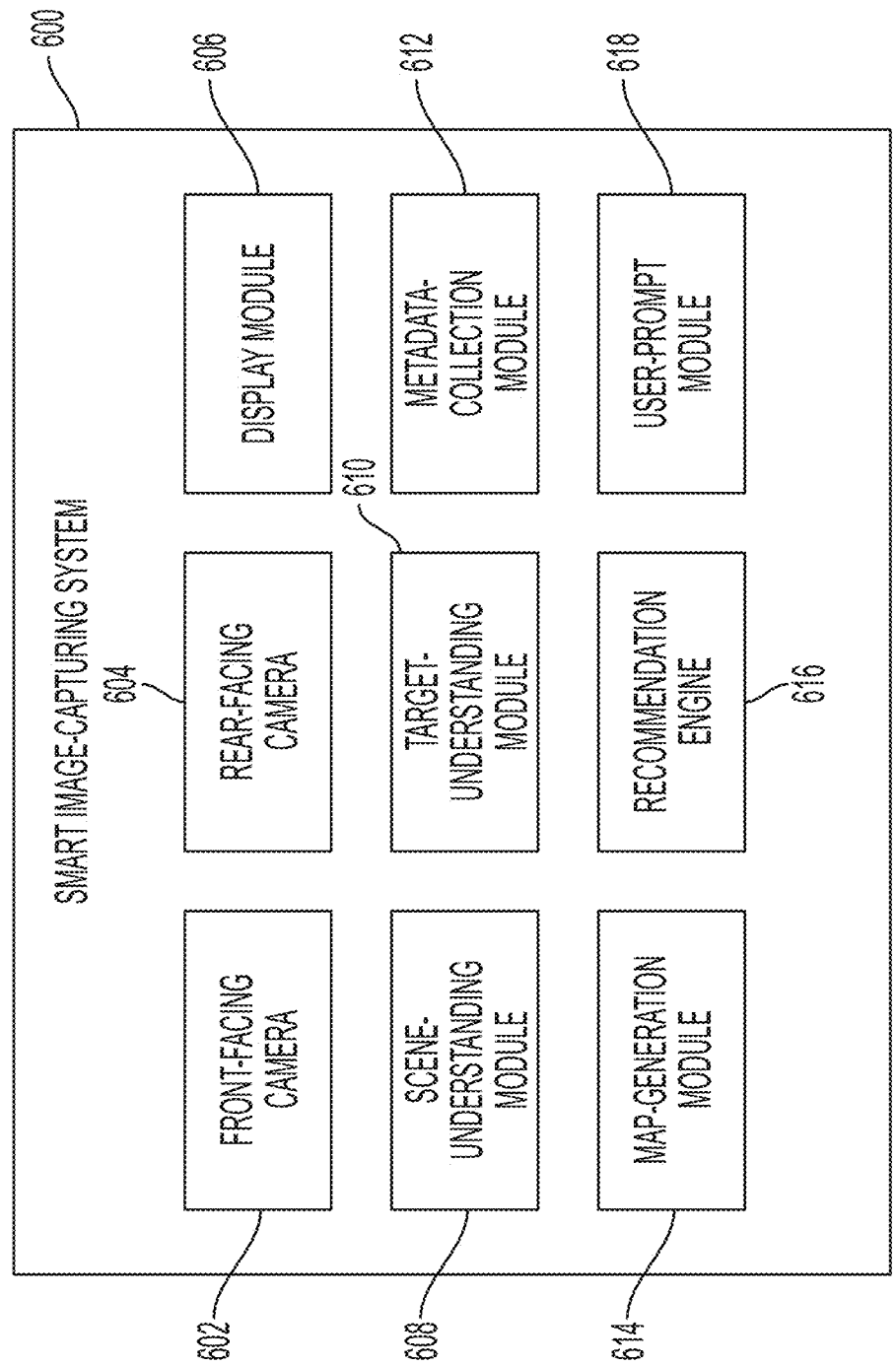
FIG. 6 illustrates an exemplary smart image-capturing system, according to one embodiment.

FIG. 6 illustrates an exemplary smart image-capturing system, according to one embodiment. Smart image-capturing system 600 can include a front-facing camera 602, a rear-facing camera 604, a display module 606, a scene-understanding module 608, a target-understanding module 610, a metadata-collection module 612, a map-generation module 614, a recommendation engine 616, and a user-prompt module 618.

Figure 7A:
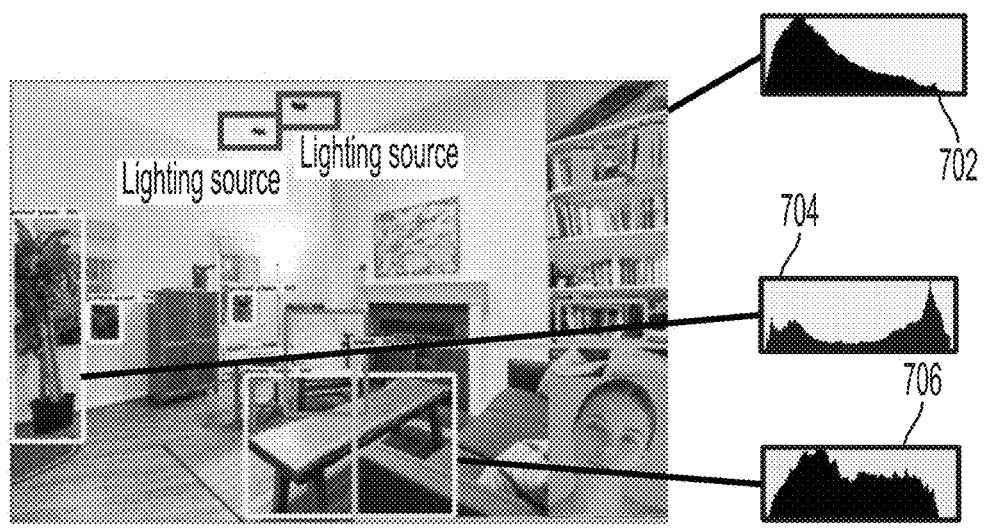
FIGS. 7A and 7B illustrate exemplary images displayed by display module 606, according to one embodiment.
Figure 7B:

Front-facing camera 602 and rear-facing camera 604 can be used to separately capture images of the environment and the target. For example, if the target is the user's face, front-facing camera 602 can be used to capture the user's selfies, whereas rear-facing camera 604 can be used to capture images of the environment. Other arrangements can also be possible. Display module 606 can be similar to display module 304 and display module 504. In addition to displaying the smart image-capturing user interface, display module 606 can be responsible for displaying images captured by cameras 602 and 604. FIGS. 7A and 7B illustrate exemplary images displayed by display module 606, according to one embodiment. In the examples shown in FIGS. 7A and 7B, images of the target (e.g., the user's face) have been inserted at the lower right corner of the images of the environment to allow the user to see both the target and the environment on display module 606. Other image arrangements can also be possible. For example, the target can be placed at a different location or the target can be shown in the background with the environment being an insertion. FIG. 7A also illustrates the image histograms (e.g., image histograms 702, 704, and 706) of a number of objects (e.g., books on a shelf, a tree, and a table) in the image of the environment. Note that such image-histograms can provide information regarding the illumination conditions at the locations close to these objects. For example, in FIG. 7A, image histogram 704 corresponds to the tree in the image, and shows the desired tonal distribution. As a result, the system can determine that the user may be able to capture a high-quality selfie standing next to the tree.

Returning to FIG. 6, depending on the operation mode of smart image-capturing system 600, during the initial set-up stage (i.e., the stage where the system is computing and recommending an optimum setting for capturing images of the target), only one camera (e.g., front-facing camera 602 or rear-facing camera 604) is capturing images, or both cameras are capturing images. For example, in a first operation mode, a single camera (e.g., rear-facing camera 604) is capturing images of the environment; in a second operation mode, a single camera (e.g., front-facing camera 602) is capturing images of the target (e.g., the user's face); and in a third operation mode, both cameras are capturing images, one for the environment and the other one for the target. When operating in the first operation mode, smart image-capturing system 600 can operate in ways similar to smart image-capturing system 300. When operating in the second operation mode, smart image-capturing system 600 can operate in ways similar to smart image-capturing system 500. Because operations of smart image-capturing systems 300 and 500 have been discussed previously, the discussion of smart image-capturing system 600 will concentrate on the third operation mode.

Scene-understanding module 608 can be similar to scene-understanding module 306 shown in FIG. 3, and target-understanding module 610 can be similar to target-understanding module 506 shown in FIG. 5. Similarly, metadata-collection module 612 can be similar to metadata-collection module 308 in FIG. 3 or metadata-collection module 508 in FIG. 5, and map-generation module 614 can be similar to map-generation module 310 in FIG. 3 or map-generation module 510 in FIG. 5.

When operating in the third operation mode, recommendation engine 616 can provide a recommendation based on outputs from scene-understanding module 608 and target-understanding module 610. This allows recommendation engine 616 to make recommendations while considering lighting statistics of both the environment and the target. Considering the lighting statistics of the target in addition to those of the environment can be beneficial, because under the same environmental conditions, different targets may exhibit different lighting characteristics, resulting in the target having different qualities in the captured images. For example, when taking a selfie, a dark-skinned individual may require more direct illumination than a light-skinned individual to achieve the desired image quality. Similarly, an object having a reflective surface (e.g., a face with oily skin) may require a location with more diffused illumination. Moreover, the 3D geometry of the target surface can also affect the image quality. For example, faces with higher cheekbones or nose bridges may be more sensitive to the direction of the lighting source.

Because recommendation engine 616 now relies on outputs from both of scene-understanding module 608 and target-understanding module 610, the training of recommendation engine 616 can involve providing images of the environment as well as images of the target such that recommendation engine 616 can recognize optimum locations for capturing the images of specific types of target.

In certain scenarios where a user may be required to take images over an extended time period (e.g., participating in a long-term study on the effect of a skin care product), recommendation engine 616 can additionally take into consideration the user's behavior pattern, which can be determined based on metadata collected by metadata-collection module 612. For example, recommendation engine 616 may predict the user's location at a particular time, and if the predicted location happens to provide good illumination at that time depending on the weather (e.g., a cloudy or sunny sky), recommendation engine 616 can provide a multi-dimensional recommendation, which can include a time and location for capturing an image. Additional dimensions, such as camera geometry (e.g., the orientation of the camera), target geometry (e.g., the orientation of the target), state of a lighting source (e.g., whether a lamp is on or off), etc., can also be included in the multi-dimensional recommendation.

In one embodiment, recommendation engine 616 may also generate an image-quality score in real time as the user moves around a physical space capturing images of the environment and/or a desired target. More specifically, recommendation engine 616 can continuously analyze the lighting statistics (e.g., by generating and analyzing image histograms) of the current environment and/or the target, and compute the quality of the image. Note that, depending on the applications, the image-quality score can be computed using various criteria. For example, applications that derive skin conditions from images may prefer an image with no shadow in the area of interest (e.g., a face or the back of a hand) and can ignore the color imbalance; whereas a different application may require more balanced colors but cares less about shadows. Therefore, when computing the image-quality score, recommendation engine 616 will assign different weights for the color balance for these two different applications. Similarly, depending on the application, the level of contrast and the brightness may be assigned certain weight factors when contributing to the final image-quality score. In some embodiments, the image-quality score can be on a scale of 1 to 10, with 10 indicating an ideal image-capturing setting and 1 indicating a poor image-capturing setting. In one embodiment, any score less than a 5 may be considered unacceptable.

User-prompt module 618 can be similar to user-prompt modules 314 and 514 shown in FIGS. 3 and 5, respectively. In addition to the examples shown in FIGS. 2A-2C, in which a number of stars are added onto the maps generated by the map-generation module (e.g., map-generation module 614) to indicate recommended image-capturing locations, user-prompt module 618 can further provide user prompts using voice command. For example, user-prompt module 618 can issue voice commands, instructing the user to "turn on a lamp," "stand next to this lamp," "sit near this window," "face west," etc., as the user moves around in his house or office building. In certain scenarios where multiple image-capturing settings (e.g., location, camera geometry, time of day) are recommended by recommendation engine 616, a user can input, ahead of time, one or more preferred settings (e.g., preferred time slots or preferred locations) such that user-prompt module 618 can filter recommendations made by recommendation engine 616 based on the user's preferred settings, and then display the filtered results. When real-time image-quality scores are provided by recommendation engine 616, user-prompt module 618 can also deliver such scores to the user in real time via various communication means, e.g., text or audio messages, or visual or tactile cues. For example, as the user is walking around a physical place using a smartphone to capture selfies, user-prompt module 618 can place the computed image-quality score on top of the captured selfies. Moreover, when the image-quality score is above a predetermined threshold (e.g., 7 on a 1 to 10 scale), user-prompt module 618 may use bold letters to display the score to draw the user's attention. Alternatively, as the user is walking around a physical place using a smartphone to capture images of the environment, user-prompt module 618 can place the computed image-quality score that is above a threshold in the captured scene on top of the location (e.g., near the tree shown in FIG. 7A) having the highest score.

User-prompt module 618 may also access a previously stored image-capturing setting to prompt the user. For example, subsequent to recommendation engine 616 recommending one or more image-capturing settings to the user, the system can store such recommended settings for later use. When the user requests image-capturing recommendations at a later time, user-prompt module 618 may directly access the stored recommendations and display such recommendations to the user. In the example shown in FIGS.

2A-2C, a number of locations (e.g., locations marked by stars) have been recommended to the user as preferred locations for capturing images. In some embodiments, at a later time, when the user seeks a recommendation from the system, the system determines that the user is in a particular physical space and that the time of day is similar, and may directly display the previous recommendations (e.g., results shown in FIGS. 2A-2C) to the user. The user can then choose to accept the past recommendations or request the system to make new recommendations.

Figure 8:
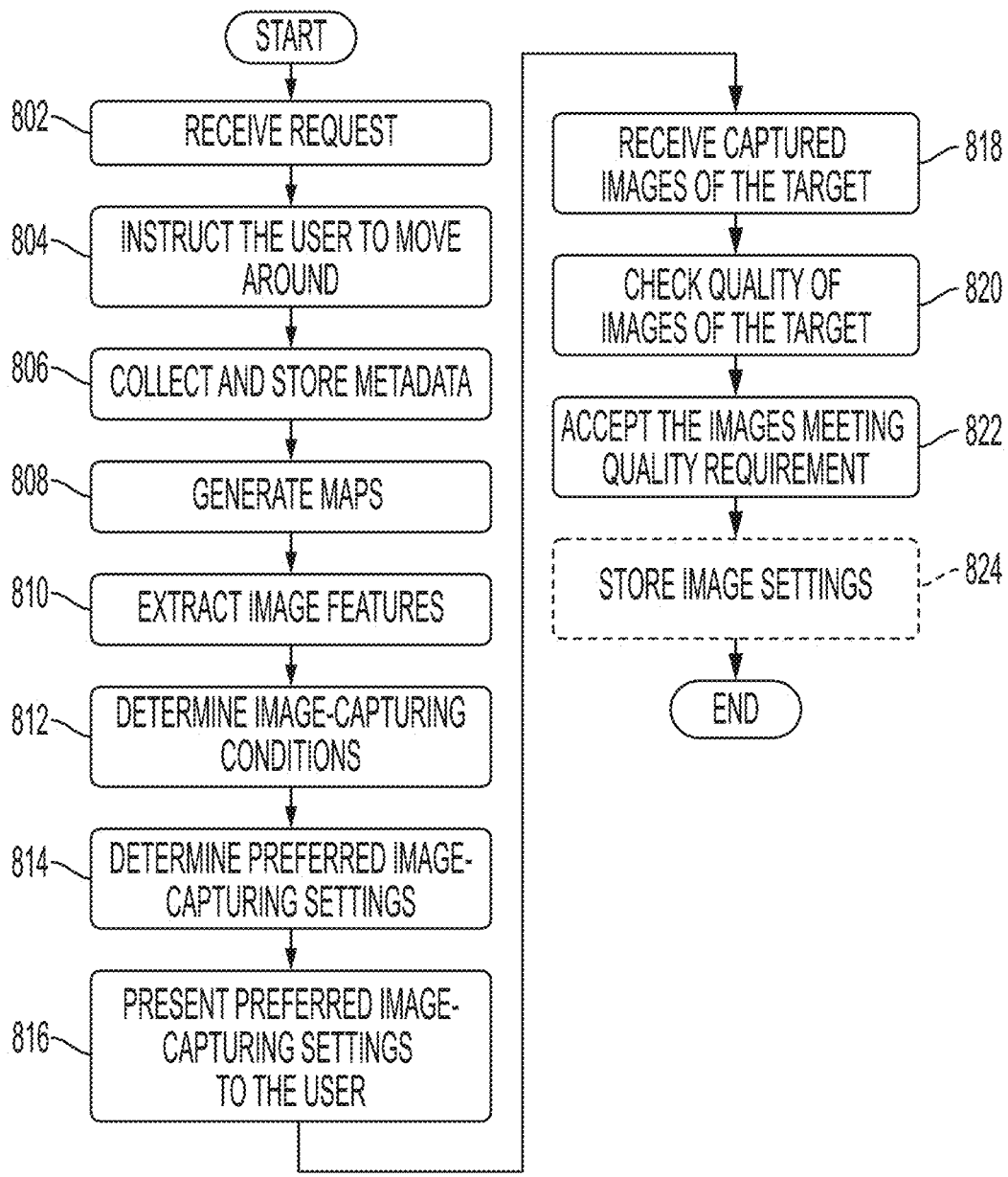
FIG. 8 presents a flowchart illustrating exemplary operations of a smart image-capturing system, according to one embodiment.

FIG. 8 presents a flowchart illustrating exemplary operations of a smart image-capturing system, according to one embodiment. During operation, the system receives, from a user, a request to capture images of a target that can be used by one or more particular applications (operation 802). The target can include a user's face or other body parts (e.g., the back of a hand), a color calibration target, or any other types of object. In response to this request, the system can instruct the user to move around a physical space while capturing images (operation 804). The physical space can be a space that the user is currently in, e.g., the user's residence or office. The instruction can be in the form of user prompts (e.g., audio or visual messages). The images can include still images and videos. Moreover, depending on the operation mode, the images can include images of the environment (the first operation mode), images of the target (the second operation mode), or both (the third operation mode). To reduce the required storage for storing these captured images and/or bandwidths for transmitting these captured images, the system can configure the camera(s) such that low-resolution images are captured by the camera(s) at this initial set-up stage.

While the user is capturing the low-resolution images of the environment and/or the target, metadata associated with each captured image (e.g., time, location, weather, camera settings, etc.) can also be collected and stored (operation 806). In certain scenarios, the smart image-capturing application may run in the background of a computing device, because the user intends to capture images of the target over a longer time period. In such situations, metadata associated with the environment and the user's movement can be collected without the user actively collecting information associated with the environment (e.g., without the user capturing images). In fact, the metadata can be collected without the user taking the computing device (e.g., a mobile phone) out of his pocket.

The system can optionally generate one or more maps of the physical space (operation 808). Exemplary maps can include but are not limited to: a 2D map, a 3D map, a series of images of the physical space taken from different angles.

The system can then extract various image features from these captured images (operation 810). In some embodiments, extracting the image features can include analyzing lighting statistics of the images. The analysis can be done over the entire image or over a portion of the image (e.g., a portion of the image containing the target or a portion of the image containing a particular object in a physical space). To do so, the system can be configured to recognize individual objects (e.g., furniture, windows, mirror, light fixtures, etc.) and environmental semantics (e.g., hallways, stairs, etc.) in the images of a physical space. Lighting statics can be obtained and recorded for each recognized object or semantic. In some embodiments, the lighting statistics can include image histograms (e.g., a color histogram, an intensity histogram, etc.). Additional image features can include positions and/or orientations of artificial light sources, the diffusive quality of the lights, the position and intensity of the shadows, color temperatures, availability of outdoor light sources, etc.

Based on the extracted image features and the collected metadata, the system can determine the image-capturing conditions associated with the physical space (operation 812). For example, based on the extracted lighting statistics, the system can determine the illumination condition of various locations (e.g., a location next to the window, a location in the center of the living room, a location on the stairs, etc.) within the physical space.

The system can further determine, based on the image-capturing conditions of the physical space and the image-quality requirement of the application requesting the image, a set of preferred image-capturing settings to be recommended to the user (operation 814). A particular image-capturing setting can include a set of parameters, including but not limited to: time, location, state of a light source (e.g., light on or light off), and camera geometry (e.g., camera angle). The determined image-capturing settings can ensure that the quality of to-be-captured images of the target meets the image-quality requirement of the particular application. For example, an application analyzing facial skin conditions may require the face in the capture image to have uniform lighting, a right amount of contrast, no shadow, etc. Therefore, the system may identify a location within the physical space that can meet such light requirements, and recommend that the user place the target at the identified location in order to capture images that meet the image-quality requirement.

The system can then present the determined image-capturing settings to the user (operation 816). In some embodiments, the system can then present the determined image-capturing settings using AR (augmented reality) or VR (virtual reality) technologies. For example, a preferred or recommended location for capturing the image of the target can be displayed as an annotation on real-world images or a virtual map of the physical space. The system can also present the determined image-capturing settings using various types of user prompt, such as text or audio messages.

Subsequently, the system receives images of the target captured by the user under a recommended setting (operation 818). Such images are high-resolution images that can potentially meet the requirements of the particular application. Upon receiving the images, the system can check the quality of the received images and, more specifically, the quality of images of the target (operation 820). For example, if the application is for studying skin conditions, it will require the skin (e.g., face or back of a hand) in the captured image to have uniform lighting, sufficient yet not too much contrast, no shadow, etc. Hence, the system can evaluate the quality of a received image, especially the face or back of the hand in the image, to determine if the image meets the requirements of the application. The system can then accept images meeting the image-quality requirement and reject images that don't meet the requirement (operation 822). The system can optionally store the settings of those images that meet the requirement (operation 824). Such settings can be used at a later time. More specifically, if the user requests additional images to be captured for the target, the system may present the stored settings to the user, thus expediting the recommendation process.

Exemplary Computer System

Figure 9:
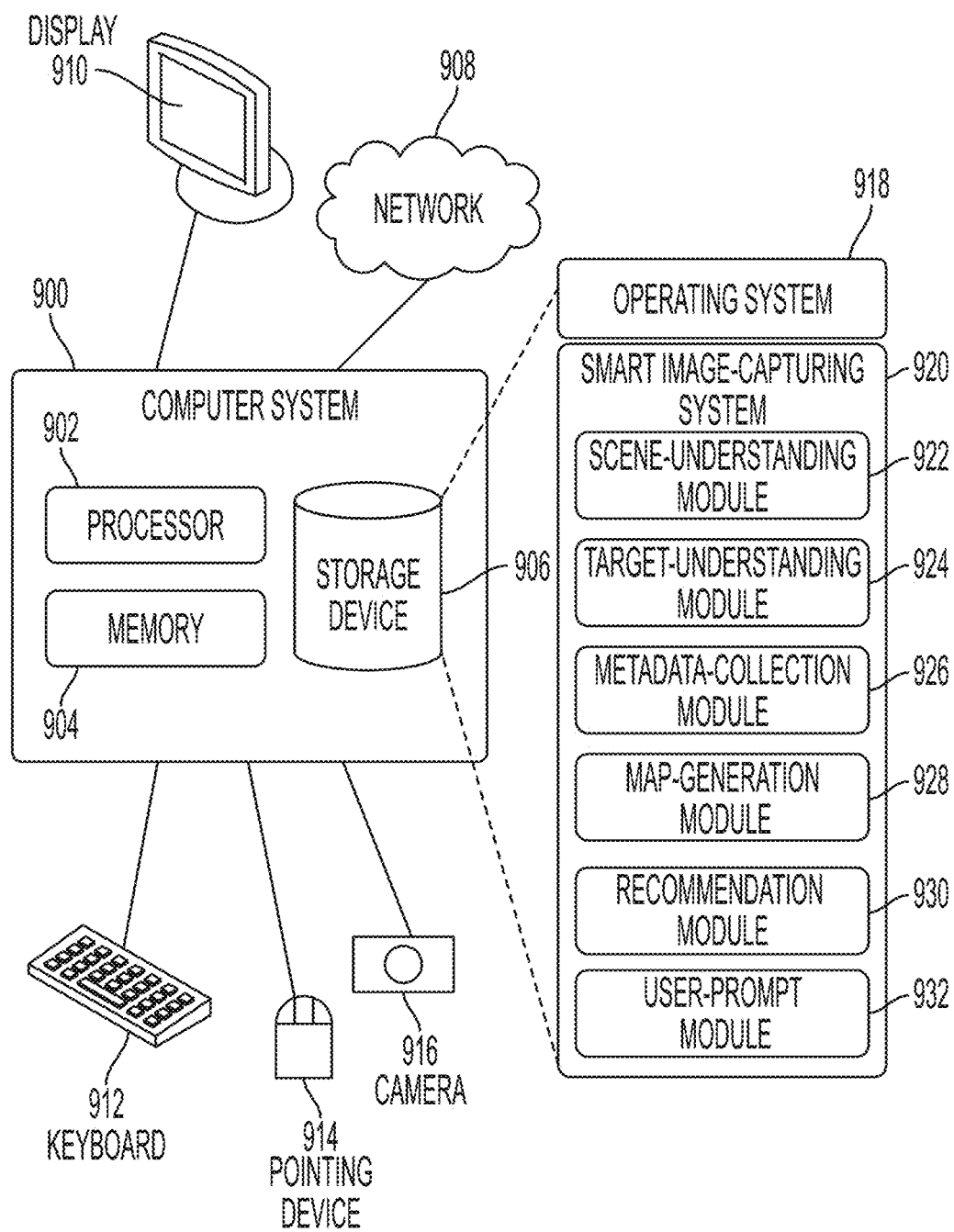
FIG. 9 illustrates an exemplary computer system that facilitates a smart image-capturing system, according to one embodiment.

FIG. 9 illustrates an exemplary computer system that facilitates a smart image-capturing system, according to one embodiment. Computer system 900 includes a processor 902, a memory 904, and a storage device 906. Computer system 900 can be coupled to a display device 910, a keyboard 912, a pointing device 914, a camera 916, and can also be coupled via one or more network interfaces to network 908. Storage device 906 can store an operating system 918 and a smart image-capturing system 920.

Smart image-capturing system 920 can include instructions, which when executed by computer system 900, can cause computer system 900 to perform methods and/or processes described in this disclosure. Smart image-capturing system 920 can include instructions for analyzing images of the environment (scene-understanding module 922), instructions for analyzing images of the target (target-understanding module 924), instructions for collecting metadata (metadata-collection module 926), instructions for generating maps (map-generation module 928), instructions for recommending image-capturing settings (recommendation module 930), and instructions for prompting the user with recommended settings for capturing images (user-prompt module 932).

In general, embodiments of the present invention provide a solution for guiding a user to navigate a physical space and/or adjust a lighting condition when the user is capturing images of a target. To ensure that the quality of the user-captured images can meet the requirements of certain applications relying on the image, the system can go through an initial set-up stage. During the initial set-up stage, the system instructs the user to capture low-resolution images of a physical environment the user is in and/or the target while moving around the physical environment, and collects metadata associated with the captured images. The system can analyze the captured images in order to determine one or more preferred settings (e.g., a location within the physical environment) for capturing images of the target. In this disclosure, we use the example of capturing selfies to explain the operations of the smart image-capturing system. In addition to selfies, a user can also use the smart image-capturing system to capture other types of images, such as images of a manufactured product. For example, depending on the physical space the user and the manufactured product are in, the smart image-capturing system can recommend an image-capturing setting such that the user can capture high-quality images of the manufactured product to enable an inspector to determine whether the manufactured product meets certain design requirements by inspecting the images. In addition to providing real-time recommendations (e.g., the system recommending image-capturing settings in real time as the user is moving around in a physical space), the system may also collect contextual data associated with the user's daily activities and recommend image-capturing settings in conjunction with the user's daily activities. Additional modules, such as a map-generation module and a user-prompt module, can facilitate the smart image-capturing system to communicate the recommended image-capturing settings to the user. In the examples shown in FIGS. 2A-2C, the recommended locations for capturing images are communicated to the user using markings on a map. However, the scope of the disclosure is not limited by the actual mechanism used for communicating the recommendations to the user. Moreover, in the examples discussed in this disclosure, the same mobile device (e.g., a smartphone or a tablet computer) is used for capturing the initial low-resolution images of the environment and/or the target and the final high-resolution image of the target. In practice, it is also possible to use different devices for the initial set-up process and the final image-capturing process. For example, a first computing device can be used to obtain image-capturing recommendations (e.g., to find an optimum location within a house for taking a selfie), whereas a second device (which can simply be a camera) can capture the desired image of the target (e.g., taking the selfie at the recommended location).

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for providing an image-capturing recommendation, the method comprising:
    capturing, by a rear-facing camera associated with a mobile computing device, one or more images of a physical space;
    capturing, by a front-facing camera associated with the mobile computing device, one or more images of a target;
    analyzing the captured images of the physical space and the captured images of the target to determine image-capturing conditions for capturing an image of the target within the physical space;
    determining, based on the image-capturing conditions and a predetermined image-quality requirement, one or more image-capturing settings; and
    recommending the determined one or more image-capturing settings to a user.

2. The method of claim 1, wherein the rear-facing and front-facing cameras are configured to capture, simultaneously, images of the physical space and the target.

3. The method of claim 1, further comprising receiving metadata associated with a respective image, wherein determining the image-capturing conditions comprises analyzing the metadata.

4. The method of claim 1, wherein a respective image-capturing setting comprises at least one of:
    a location;
    a time; and
    camera geometry.

5. The method of claim 1, further comprising:
    generating a map associated with the physical space; and
    displaying a location indicator on the map, indicating a recommended location within the physical space for capturing the image of the target.

6. The method of claim 1, wherein analyzing a respective image comprises:

identifying one or more objects within the respective image; and computing lighting statistics associated with an identified object within the respective image.

7. The method of claim 6, wherein the lighting statistics comprise an image histogram associated with the identified object within the respective image.

8. The method of claim 1, further comprising:

collecting contextual data associated with daily activities of the user; and determining, based on the collected contextual data, an image-capturing setting.

9. A computer system for providing an image-capturing recommendation, the system comprising:

a processor; and a storage device coupled to the processor and storing instructions which when executed by the processor cause the processor to perform a method, wherein the method comprises:

capturing, by a rear-facing camera associated with a mobile computing device, one or more images of a physical space;

capturing, by a front-facing camera associated with the mobile computing device, one or more images of a target;

analyzing the captured images of the physical space and the captured images of the target to determine image-capturing conditions for capturing an image of the target within a physical space;

determining, based on the image-capturing conditions and a predetermined image-quality requirement, one or more image-capturing settings; and recommending the determined one or more image-capturing settings to a user.

10. The computer system of claim 9, wherein the rear-facing and front-facing cameras are configured to capture, simultaneously, images of the physical space and the target.

11. The computer system of claim 9, wherein the method further comprises receiving metadata associated with a respective image, and wherein determining the image-capturing conditions comprises analyzing the metadata.

12. The computer system of claim 9, wherein a respective image-capturing setting comprises at least one of:

a location;

a time; and camera geometry.

13. The computer system of claim 9, wherein the method further comprises:

generating a map associated with the physical space; and displaying a location indicator on the map, indicating a recommended location within the physical space for capturing the image of the target.

14. The computer system of claim 9, wherein analyzing a respective image comprises:

identifying one or more objects within the respective image; and computing lighting statistics associated with an identified object within the respective image.

15. The computer system of claim 14, wherein the lighting statistics comprise an image histogram associated with the identified object within the respective image.

16. The computer system of claim 9, wherein the method further comprises:

collecting contextual data associated with daily activities of the user; and determining, based on the collected contextual data, an image-capturing setting.

17. A non-transitory computer-readable storage medium storing instructions that when executed by a computer cause the computer to perform a method for providing an image-capturing recommendation, the method comprising:

capturing, by a rear-facing camera associated with a mobile computing device, one or more images of a physical space;

capturing, by a front-facing camera associated with the mobile computing device, one or more images of a target;

analyzing the captured images of the physical space and the captured images of the target to determine image-capturing conditions for capturing an image of the target within a physical space;

determining, based on the image-capturing conditions and a predetermined image-quality requirement, one or more image-capturing settings; and recommending the determined one or more image-capturing settings to a user.

18. The non-transitory computer-readable storage medium of claim 17, wherein the method further comprises:

generating a map associated with the physical space; and displaying a location indicator on the map, indicating a recommended location within the physical space for capturing the image of the target.

19. The non-transitory computer-readable storage medium of claim 17, wherein analyzing a respective image comprises:

identifying one or more objects within the respective image; and computing lighting statistics associated with an identified object within the respective image, wherein the lighting statistics comprise an image histogram associated with the identified object within the respective image.

20. The non-transitory computer-readable storage medium of claim 17, wherein the method further comprises:

collecting contextual data associated with daily activities of the user; and determining, based on the collected contextual data, an image-capturing setting.

\* \* \* \* \*